United States Patent
Schmalenberg et al.

(10) Patent No.: US 11,173,837 B2
(45) Date of Patent: Nov. 16, 2021

(54) SYSTEMS AND METHODS FOR OPTICALLY CLOAKING OBJECTS USING A PHOTOPHORETIC OPTICAL TRAP DISPLAY

(71) Applicant: Toyota Motor Engineering & Manufacturing North America, Inc., Plano, TX (US)

(72) Inventors: Paul Schmalenberg, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/270,288

(22) Filed: Feb. 7, 2019

(65) Prior Publication Data
US 2020/0254930 A1    Aug. 13, 2020

(51) Int. Cl.
*B60R 1/00* (2006.01)
*G02F 1/1685* (2019.01)
(Continued)

(52) U.S. Cl.
CPC ............. *B60R 1/00* (2013.01); *B62D 25/04* (2013.01); *G02F 1/1677* (2019.01);
(Continued)

(58) Field of Classification Search
CPC ..... B60R 1/00; B60R 2011/004; B60R 11/04; B60R 2300/105; B60R 2300/802; B60R 2001/1253; G06K 9/00805; G06K 9/00791; G08G 1/167; B60K 35/00; B60Q 9/008; H04N 7/181; H04N 7/183; B60W 50/14
See application file for complete search history.

(56) References Cited

U.S. PATENT DOCUMENTS 6,857,746 B2    2/2005  Dyner
6,997,558 B2    2/2006  Perlin et al.
(Continued)

FOREIGN PATENT DOCUMENTS

CN    101872066 B    7/2014
WO    2016179158 A2    11/2016

OTHER PUBLICATIONS

McDonald, Glenn, New Technique Generates Free-Floating 3D Images. Just Don't Call It a Hologram, Seeker, https://www.seeker.com/gadgets/new-technique-generates-free-floating-3d-images-just-dont-call-it-a-hologram, published Jan. 24, 2018, 5 pages.
(Continued)

*Primary Examiner* — Farhan Mahmud
(74) *Attorney, Agent, or Firm* — Dinsmore & Shohl LLP (57) ABSTRACT

A system for optically cloaking an object includes a photophoretic optical trap display including a trap light source and an illumination light source; and a visual sensor at a first visual sensor location. The visual sensor captures an image of a scene, the trap light source is configured to generate a trap beam to control one or more of a position and an orientation of a scattering particle, and the illumination light source is configured to generate an illumination beam to illuminate the scattering particle to generate a reproduction image based on the image of the scene captured by the visual sensor.

17 Claims, 4 Drawing Sheets

(51) Int. Cl.
*G02F 1/1677* (2019.01)
*B62D 25/04* (2006.01)
*H04N 13/398* (2018.01)
*H04N 13/327* (2018.01)
*H04N 5/247* (2006.01)

(52) U.S. Cl.
CPC ......... *G02F 1/1685* (2019.01); *H04N 13/327* (2018.05); *H04N 13/398* (2018.05); *B60R 2300/202* (2013.01); *B60R 2300/802* (2013.01); *H04N 5/247* (2013.01)

(56) References Cited

U.S. PATENT DOCUMENTS

| | | | |
|---|---|---|---|
| 8,247,755 | B2 | 8/2012 | Refai et al. |
| 9,716,878 | B2 | 7/2017 | Teller |
| 10,129,517 | B2 | 11/2018 | Smalley et al. |
| 2011/0096093 | A1* | 4/2011 | Oi et al. ............... G06T 19/006 345/633 |
| 2013/0100290 | A1* | 4/2013 | Sato .................... G06T 7/80 348/148 |
| 2015/0002954 | A1* | 1/2015 | Lynam ................. B60R 1/082 359/866 |
| 2015/0009100 | A1* | 1/2015 | Haneda ................. B60R 1/00 345/7 |
| 2017/0161950 | A1 | 6/2017 | Seder et al. |

OTHER PUBLICATIONS

Smalley et al., Volumetric Displays: Turning 3-D Inside-Out, Optics & Photonics News, https://www.osa-opn.org/home/articles/volume_29/june_2018/features/volumetric_displays_turning_3-d_inside-out/, published Jun. 2018, 6 pages.

Smalley, et al., A Photophoretic-trap Volumetric Display, Springer Nature, Jan. 25, 2018, pp. 486-489, vol. 553, Macmillian Publishers Limited.

* cited by examiner

SYSTEMS AND METHODS FOR OPTICALLY CLOAKING OBJECTS USING A PHOTOPHORETIC OPTICAL TRAP DISPLAY

TECHNICAL FIELD

The present specification generally relates to systems and methods for optically cloaking an object and more specifically to systems and methods for optically cloaking an object using a photophoretic optical trap display.

BACKGROUND

Opaque objects may narrow or block a field of view. For example, opaque objects like an a-pillar of a vehicle may narrow or block a driver's field of view while driving. Accordingly, systems and methods for optically cloaking objects using photophoretic optical trap displays may be desired.

SUMMARY

In one embodiment, a system for optically cloaking an object includes a photophoretic optical trap display including a trap light source and an illumination light source, and a visual sensor at a first visual sensor location. The visual sensor captures an image of a scene, the trap light source is configured to generate a trap beam to control one or more of a position and an orientation of a scattering particle, and the illumination light source is configured to generate an illumination beam to illuminate the scattering particle to generate a reproduction image based on the image of the scene captured by the visual sensor.

In another embodiment, a vehicle includes a system for optically cloaking an object. The system includes a photophoretic optical trap display comprising a trap light source and an illumination light source, and a visual sensor at a first visual sensor location. The visual sensor captures an image of a scene, the trap light source is configured to generate a trap beam to control one or more of a position and an orientation of a scattering particle, and the illumination light source is configured to generate an illumination beam to illuminate the scattering particle to generate a reproduction image based on the image of the scene captured by the visual sensor.

In yet another embodiment, a method of optically cloaking an object includes positioning a scattering particle screen in a vicinity of the object, capturing an image of a scene using a visual sensor, and displaying a reproduction image that is based on the image of the scene captured by the visual sensor by illuminating the scattering particle screen using an illumination light source.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Opaque objects located between a vantage point and an observed object may eclipse or distort a view of the observed object from the vantage point. In some situations, it may be advantageous to reduce the number of eclipsed objects. For example, it may be advantageous to reduce the number of objects that are eclipsed by the structural components of a vehicle, such as the a-pillar of a vehicle. Generally speaking, an a-pillar extends between a hood and a roof of a vehicle and provides support for the roof, the windshield, and other components of the vehicle. It may be possible to cloak an a-pillar, or any object, with an image that is a visual reproduction of the surrounding environment. Moreover, it may be possible to calibrate that image based on a particular vantage point, such that the object is cloaked in a reproduction image that appears as the surrounding environment would appear from the vantage point in the absence of the object. This cloaking may effectively remove the object from the field of view of an observer at the vantage point. In some embodiments, the object may be cloaked using a photophoretic trap display that generates an image by illuminating one or more particles that are trapped using photophoresis.

Photophoresis refers to using light to impart forces on objects. For example, micron-sized particles may be suspended in air using light through direct and/or indirect photophoresis. For example, micron-sized particles may be suspended in a gas (e.g., aerosols, air, etc.) or a liquid (e.g., hydrocolloids) and may move when a light beam (e.g., a laser) of sufficient intensity and wavelength illuminates the particle. This movement can be due to radiation pressure force (direct photophoresis) and/or a non-uniform distribution of temperature of the particles in the fluid medium (indirect photophoresis). In some embodiments, an electrostatic force generated within the beam of light may impart one or more forces on the particle. Relatedly, in a fluid mixture of different types of particles, dissimilar particles may demonstrate dissimilar movement characteristics from one another based on differences in size, shape, thermal radiation absorption characteristics and other characteristics. This effect may be referred to as thermophoresis and may be controlled to manipulate the movement of particles.

Direct photophoresis occurs due to a transfer of photon momentum to a particle by refraction and reflection and a difference in refractive index between adjacent particles. More specifically, particles may move relative to their surrounding medium when there is a difference in the refractive index between the particle and the surrounding medium. The refractive index is the ratio of the velocity of light in a vacuum to its velocity in a specified medium. A particle with a higher refractive index compared to its surrounding molecule or molecules may move away from the light source at a higher rate than the surrounding medium due to a difference in rate of momentum transfer between the particle and the surrounding medium as energy is absorbed from the photons of light that are scattered and absorbed from the particle. This transfer of momentum from photon to particle is referred to as radiation pressure force and is the force responsible for direct photophoresis and is dependent on light intensity and particle size but the momentum transfer and thus movement of the particle is not affected by the surrounding medium.

Indirect photophoresis may also be used to displace particles. Indirect photophoresis occurs as light heats one side of a particle suspended in a medium resulting in a temperature differential across the particle. Molecules in the surrounding medium may reach temperature equilibrium with the surface of the particle, that is, the molecules surrounding the particle on the heated side may experience an increase in temperature and molecules on the relatively cool side may remain relatively cool. Generally, the molecules on the relatively heated side of the particle will have a higher kinetic energy. Thus, these higher energy molecules, when impinging the particle, may impart a greater momentum change to the particle than the molecules on the relatively cool side of the particle resulting in a momentum gradient across the particle and tending to move the particle toward the area of lower momentum (i.e., from the relatively hot region toward the relatively cold region). The component of the photophoretic force responsible for this phenomenon is called the radiometric force. The indirect photophoretic effect may also be referred to as the "radiometric force."

Additionally, it is possible to select the wavelength of light and the particle size to control the movement of the particle. For example, a particle with a diameter less than or comparable to the wavelength of a given beam of light may be moved toward the light source due to negative indirect photophoresis. Negative indirect photophoresis may occur due to the unequal heat generation on the back and front sides of particles. That is, the wavelength of light may be selected such that it heats the side of a particle opposite the light source rather than the side of the particle facing the light source. This may result in a temperature gradient in the medium around the particle, causing the particle to move towards the light source.

An individual particle can be controlled using the photophoretic effect by utilizing astigmatism aberration. In general, an ideal lens has a single focal point for the light passing through a first side of the lens. Optical aberrations can be added to a lens to spread the light passing through the lens over a region rather than at the single focal point. Aberrations can be monochromatic or chromatic. Chromatic aberrations may occur due to dispersion, the variation of a lens's refractive index with wavelength. Additionally, a lens may have a positive or a negative spherical aberration that causes light passing through the edges of lens to have a different focal point than light passing through the center of the lens. If the light passing through the edges of the lens focuses nearer the lens, the aberration is positive and vice-a-versa.

Additionally, an optical system may utilize astigmatism to manipulate the focus of light. Astigmatism may occur in two forms: third-order and non-axisymmetric astigmatism. Light may propagate from a given point in two planes: tangential plane and a sagittal plane. Rays that propagate in the tangential plane are tangential rays. The tangential plane may also be called the meridional plane. The second plane is the sagittal plane and is defined as the plane orthogonal to the meridional plane. In third-order astigmatism, sagittal and transverse rays form foci at different distances along the optic axis. These foci may be referred to as the sagittal focus and the transverse focus, respectively. The amount of aberration due to astigmatism is proportional to the square of the angle between the rays from the object and the optical axis of the system. The principles of astigmatism may provide a tool for varying the intensity distribution of light to enable trapping a particle using the photophoretic effects described herein. Astigmatism and astigmatic aberration enable movement of the focal point of a beam of light (e.g., a laser). By controlling the focal point of a light beam, the location of a beam waist of the light can be controlled. One or more particles may be trapped at the beam waist based on the principles described herein and the location of the waist can be moved to move the trapped particle.

Figure 1:
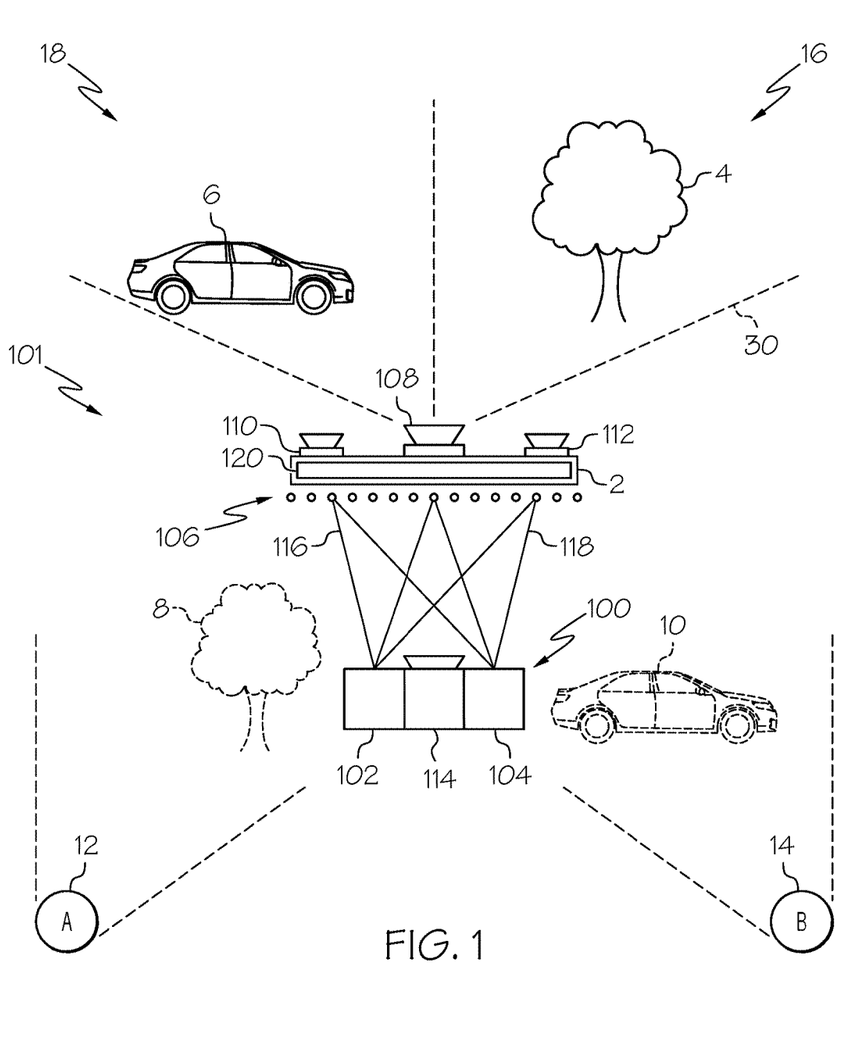
FIG. 1 depicts a system for optically cloaking objects, according to one or more embodiments shown and described herein.

Referring generally to FIG. 1, a system for optically cloaking an object is shown. The system includes a photophoretic optical trap display device including a trap light source and an illumination light source. One or more scattering particles form a scattering particle screen in a vicinity of the object and a visual sensor is located at a first visual sensor location. As shown in FIG. 1, in embodiments, the visual sensor captures an image of a scene, the trap light source manipulates one or more of a position and an orientation of the one or more scattering particles in the vicinity of the object, and the illumination light source illuminates the one or more scattering particles to generate a reproduction image based on the image of the scene. The reproduction image may be viewed from different angles and orientations to give an observer a view of the scene behind the object, thus effectively removing the object from the observer's vantage by cloaking the object and giving the observer an unobstructed view. Various embodiments of systems and methods for optically cloaking an object will be described in greater detail herein with specific reference to the corresponding drawings.

Referring now specifically to FIG. 1, a system 101 for optically cloaking an object 2 is shown. The system 101 includes a trap light source 102 configured to generate a trap beam, an illumination light source 104 configured to generate an illumination beam, a scattering particle screen 106 that is made of one or more scattering particles, and a visual sensor 108. Some embodiments of the system 101 may include one or more of a second visual sensor 110, a third visual sensor 112, and a calibration visual sensor 114. The trap light source 102 projects one or more optical trap beams 116 to trap a scattering particle (e.g., to affect one or more of a position and an orientation of the scattering particle) according to the principles of photophoresis described herein. The illumination light source 104 projects one or more illumination beams 118 to illuminate the scattering particle screen 106. Some embodiments of the system 101 may include a scattering particle screen manipulation device 120 that may manipulate one or more of a position and orientation of the one or more scattering particles in the scattering particle screen 106.

As shown in FIG. 1, the system 101 may be used to produce a reproduction image of a scene using the scattering particle screen 106 positioned between a vantage point and the object 2. FIG. 1 shows a first object 4 reproduced as a first reproduction image 8 and a second object 6 reproduced as a second reproduction image 10 on the scattering particle screen 106. The first reproduction image 8 and the second reproduction image 10 may be visible when viewed from a first vantage point 12 and a second vantage point 14, respectively. FIG. 1 also shows a field of view (FOV) 30 of the visual sensor 108 dissected into a first scene sector 16 and a second scene sector 18, as will be described in greater detail herein. Although not depicted, each of the second visual sensor 110, the third visual sensor 112, and the calibration visual sensor 114 includes a FOV that is similar, although not identical, to the FOV 30 of the visual sensor 108.

The photophoretic optical trap display 100 may operate to trap and illuminate one or more scattering particles as described in greater detail herein. One or more of the trap light source 102 and the illumination light source 104 is a light source (e.g., laser, light emitting diodes, etc.). The trap light source 102 may be of sufficient frequency, amplification, and wavelength to manipulate the physical position (i.e., to move) one or more particles. In some embodiments, the light generated by the trap light source 102 may be outside the visual spectrum of light. For example, the trap light source 102 may use infrared light. The illumination light source 104 may be used to illuminate the one or more particles moved by the trap light source 102. The illumination light source 104 may be configured to illuminate the one or more trapped particles with any wavelength of light, for example, with visible light at any frequency on the visible spectrum, or with infrared or ultraviolet light. In some embodiments, the trap light source 102 and the illumination light source 104 may be combined into a single, co-linear beam of light, such that the one or more particles are trapped and illuminated by the same co-linear beam of light. The photophoretic optical trap display 100 may include one or more lenses, reflectors, or other devices or implementations for bending, reflecting, focusing, or otherwise manipulating the light emitted by the trap light source 102 and the illumination light source 104.

Light from the trap light source 102 may be used to develop one or more forces across the one or more particles to trap the particle and control movement of the one or more particles in a three-dimensional environment. For example, the trap light source 102 may develop a temperature differential across the one or more scattering particles to create a difference in momentum across the scattering particles according to the principles described herein. In some embodiments, the one or more scattering particles may be manipulated by a radiation pressure force created by the beam generated by the trap light source 102. In some embodiments, the trap light source 102 may be sent through a microscope objective or some other device configured to focus a beam as described herein and the one or more scattering particles may be trapped at the beam waist, which may exhibit a strong electric field gradient. In some embodiments, lateral and axial (i.e., in the longitudinal direction of the beam generated by the trap light source 102) movement may be controlled using a specific light beam intensity profile that is generated with astigmatism aberration and a spatial light modulator (SLM). Additionally, the trap light source 102 may be used to turn, spin, polarize, or otherwise orient the one or more scattering particles in a particular polarization and/or orientation. For example, the trap light source 102 may apply orienting torque to a trapped particle by anisotropically scattering polarized light off of the trapped particle. In some embodiments, the trapped particle may be oriented by changing one or more of a wavelength, an amplitude, and a frequency of the beam generated by the trap light source 102. Accordingly, the scattering particles may move based on the movement of the trap light source 102. In some embodiments, the trap light source 102 may move the one or more trapped scattering particles in the scattering particle screen 106 at a rate faster than detectable by the human eye in order to generate a three-dimensional image in cooperation with the illumination light source 104. It is contemplated that embodiments include any number of trap light sources 102. It is contemplated that any source of light can be used to generate the trap beam. In some embodiments, the trap light source 102 is a laser configured to emit laser light.

The illumination light source 104 may illuminate the one or more scattering particles with visible or other forms of light. For example, the illumination light source 104 may be an RGB LED that illuminates the one or more scattering particles with visible light. Visible light generated by the illumination light source 104 and reflected from the one or more scattering particles may be used to reproduce an image of a scene that may be used to simulate the scene to an observer, for example. The intensity, wavelength, and position of the illumination light source 104 and/or the trap light source 102 may be controlled, for example, by a controller or other system (e.g., a processor and memory module that stores one or more processor-readable instruction sets).

In some embodiments, the beams generated by the trap light source 102 and/or the illumination light source 104 may be divided or combined by one or more of, for example: an optical grate, such as a Dammann grate (DG): a prism: a chiral liquid filter; and the like. Additionally, the trap light source 102 and/or the illumination light source 104 may be bent, aligned, or otherwise formed or manipulated using one or more of an optical filter, a lens, a prism, and the like. By dividing the light generated by the trap light source 102 and/or the illumination, one trap light source 102 and/or one illumination light source 104 may be used to manipulate and/or illuminate one or more scattering particles at a time using a single generated beam. In some embodiments, one or more of the trap light source 102 and the illumination light source 104 may be formed from a matrix of multiple lasers or other light sources (e.g., bulbs, LEDs, etc.) and the matrices may be used to form multiple trap and/or illumination beams.

The one or more scattering particles may be held in place by the trap light source 102 to form the scattering particle screen 106. The one or more scattering particles may be microscopic particles that reflect light when illuminated, for example, by the illumination light source 104. The scattering particles may be, for example, microscopic pieces of crushed silicon, silicon dioxide, silicon nitride, or other silicate product. In some embodiments, the scattering particles may be formed from a liquid, e.g., a liquid that can be used to create small flat particles. The scattering particles may be isotropic or anisotropic. In some embodiments, the scattering particle screen 106 may include one or more sections and each section may selectively include isotropic and/or anisotropic particles, such that the various sections of the scattering particle screen 106 can be viewed distinctly from different angles. Anisotropic scattering particles may include multiple surfaces for reflecting light in various ways that may enable two or more distinct images to be displayed from two or more distinct vantages. The anisotropic scattering particles may include, for example, multiply-sided mirrors or prisms with intricate structures that can reflect light anisotropically.

Still referring to FIG. 1, the one or more scattering particles may be held in place around the object 2 using the trap light source 102. For example, the trap light source 102 may hold the scattering particles such that the scattering particle screen 106 is visible between an observer and the object 2. The scattering particle screen 106 may then be illuminated such that an image is displayed over the object to obscure sight of the object. The image created by the photophoretic optical trap display 100 that is displayed using the scattering particle screen 106 may be captured by, for example, the visual sensor 108 such that the object is covered by a real-time or near real-time image of the scene behind the object 2 (i.e., what an observer at the first vantage point 12 or second vantage point 14 would see if the object was not blocking his or her view of that location).

Still referring to FIG. 1, the scattering particle screen manipulation device 120 may be used to manipulate one or more of a position and an orientation of the one or more scattering particles. For example, the scattering particle screen manipulation device 120 may hold, lift, or move one or more scattering particles. In some embodiments, the scattering particle screen manipulation device 120 may polarize the one or more scattering particles to orient the one or more scattering particles in a particular orientation. In some embodiments, the scattering particle screen manipulation device 120 may orient the one or more scattering particles in a particular orientation based on a vantage point of the viewer of the screen. For example, the scattering particle screen manipulation device 120 may orient the one or more scattering particles to occlude a portion or portions of the scattering particle screen 106 from the first vantage point 12 and/or the second vantage point 14. The scattering particle screen manipulation device 120 may use one or more of electromagnetic, magnetic, fluid pressure (e.g., air pressure, etc.), and ultrasonic forces to manipulate a position and/or an orientation of the one or more scattering particles. For example, the scattering particle screen manipulation device 120 may use one or more of electromagnetic, magnetic, fluid pressure (e.g., air pressure, etc.), and ultrasonic forces to generate a texture to the three-dimensional image generated by the photophoretic optical trap display 100.

In some embodiments, one or more of the trap light source 102 and the scattering particle screen manipulation device 120 may be used to occlude one or more sectors of the scene captured by the visual sensor 108 from one or more vantage points. For example the second scene sector 18 may be occluded from a reproduction image of the scene generated on the scattering particle screen 106 that is visible from the first vantage point 12 because this sector may be visible from the first vantage point 12. Similarly, in some embodiments, the first scene sector 16 may be occluded from view from the second vantage point 14 by manipulating one or more of the orientation and the position of the one or more scattering particles.

Figure 3:
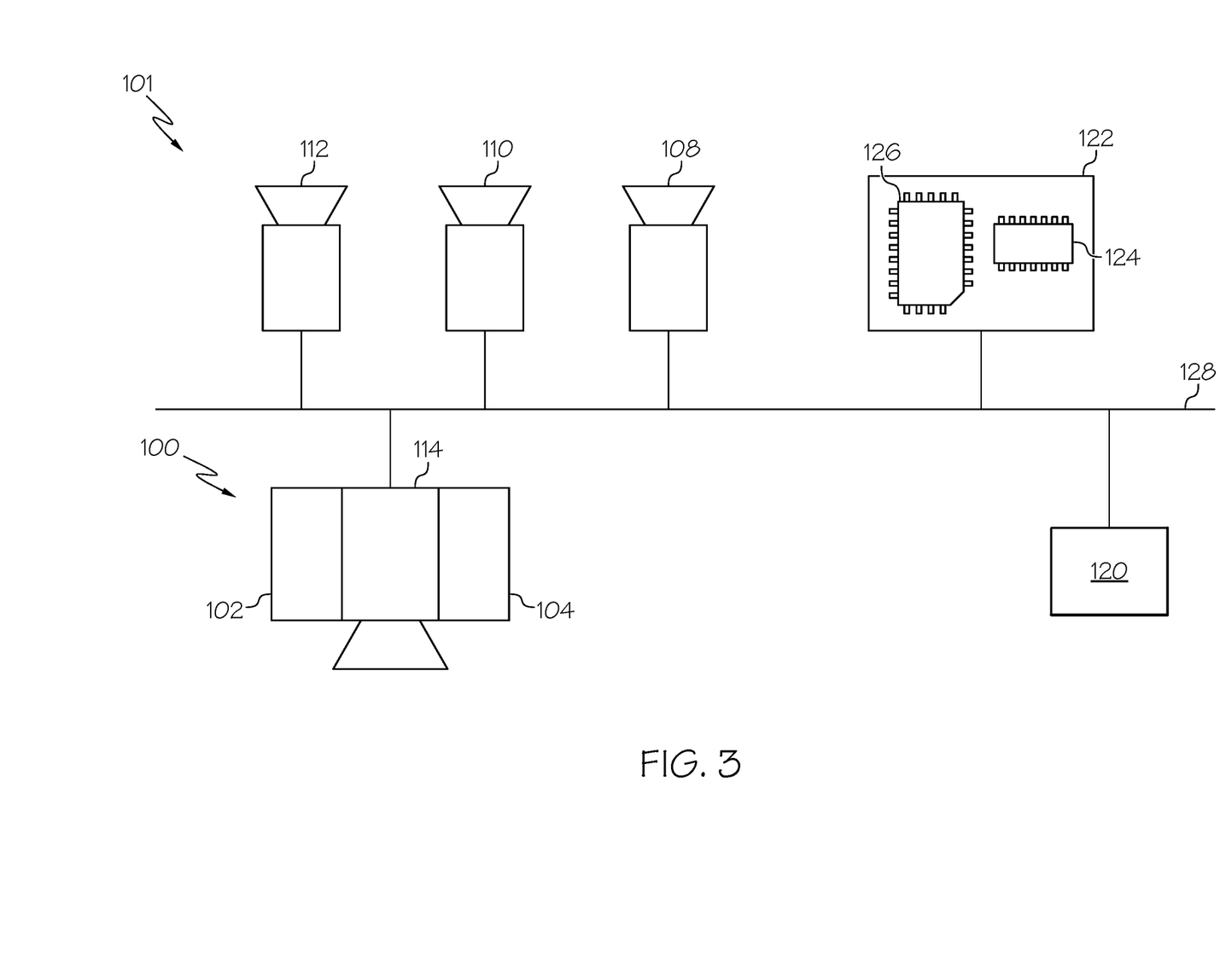
FIG. 3 depicts a schematic of the system for optically cloaking objects of FIG. 1, according to one or more embodiments shown and described herein.

Referring briefly to FIG. 3, a schematic representation of an exemplary embodiment of the system 101 for cloaking objects is shown. The exemplary embodiment includes the trap light source 102, the illumination light source 104, the visual sensor 108, the second visual sensor 110, the third visual sensor 112, and the scattering particle screen manipulation device 120. The exemplary embodiment also includes a control module 122 that includes a processor 124 and a memory module 126. The control module 122 is coupled to the other components through a bus 128.

Still referring to FIG. 3, the system 101 may further include one or more visual sensors, such as the visual sensor 108, the second visual sensor 110, the third visual sensor 112, and the calibration visual sensor 114. Each of the visual sensors is coupled to the bus 128 and communicatively coupled to the processor 124. Each of the visual sensors may be any device having an array of sensing devices capable of detecting radiation in an ultraviolet wavelength band, a visible light wavelength band, or an infrared wavelength band. Each of the visual sensors may have any resolution. The visual sensors may include one or more omni-directional cameras or panoramic cameras. In some embodiments, one or more optical components, such as a mirror, fish-eye lens, or any other type of lens may be optically coupled to at least one of the visual sensors. The visual sensors may be used to capture an image of an object external to the vehicle or to capture an image of the scattering particle screen 106 as described in greater detail herein. The visual sensors may be located inside the vehicle or external to the vehicle to capture image data of the occupants in the vehicle or objects outside the vehicle. In some embodiments, the image data may be used to identify the occupants of the vehicle and/or external objects.

In operation, the visual sensors capture image data and communicate the image data to the system 101 and/or to other systems communicatively coupled to the bus 128. The image data may be received by the processor 124, which may process the image data using one or more image processing algorithms. Any known or yet-to-be developed video and image processing algorithms may be applied to the image data in order to identify an item, situation, or person. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. In some embodiments, image data including images of the occupants of the vehicle and/or internal or external objects is processed to determine an identity of the occupant or object as described in greater detail herein. For example, camera-captured biometrics (facial recognition technology, finger print scanning, eye scanning, etc.) may be utilized to identify and/or authenticate the identity of an occupant of the vehicle.

The processor 124 may include any processing component(s) configured to receive and execute programming instructions (such as from the memory module 126) for carrying out the functions described herein. The instructions may be in the form of a machine-readable instruction set stored in the memory module 126 (e.g., one or more programming instructions). Accordingly, the processor 124 may be an electric controller, an integrated circuit, a microchip, a computer, or any other computing device. The processor 124 is communicatively coupled to the other components of the system 101 through the bus 128. Accordingly, the bus 128 may communicatively couple any number of processors 124 with one another, and allow the components coupled to the bus 128 to operate in a distributed computing environment. In some embodiments, the bus 128 is a CAN bus. Each of the components may operate as a node that may send and/or receive data. Furthermore, while the embodiment depicted in FIG. 3 includes a single processor 124, some embodiments may include more than one processor 124.

The memory module 126 may be a volatile and/or non-volatile digital storage component and, as such, may include random access memory (including SRAM, DRAM, and/or other types of random access memory), flash memory, registers, compact discs (CD), digital versatile discs (DVD), and/or other types of storage components. The memory module 126 may reside local to and/or remote from the system 101 and may be configured to store one or more pieces of data for access by the system 101 and/or other components.

The memory module 126 may be machine-readable memory (which may also be referred to as a non-transitory processor readable memory). The memory module 126 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory module 126 may be configured to store operating logic, which may be embodied as a computer program, firmware, or hardware, as an example and that may include an operating system and/or other software for managing components of the system 101.

As noted above, the system 101 includes the bus 128. The bus 128 may be formed from any medium that is capable of transmitting a signal such as, for example, conductive wires, conductive traces, optical waveguides, or the like. Moreover, the bus 128 may be formed from a combination of mediums capable of transmitting signals. In one embodiment, the bus 128 includes a combination of conductive traces, conductive wires, connectors, and buses that cooperate to permit the transmission of electrical data signals to components such as processors, memories, sensors, input devices, output devices, and communication devices. Accordingly, the bus 128 may be or include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The bus 128 communicatively couples the various components of the system 101. As used herein, the term "communicatively coupled" means that coupled components are capable of exchanging data signals with one another such as, for example, electrical signals via conductive medium, electromagnetic signals via air, optical signals via optical waveguides, and the like. In some embodiments, the bus 128 may be coupled to network interface hardware for communicatively coupling the system 101 with one or more external networks. For example, the system 101 may communicatively couple with one or more external cloud networks using a wireless network connection, for example, using a wi-fi connection and/or a connection to a cellular network.

Referring to FIGS. 1 and 3, each of the visual sensor 108, the second visual sensor 110 and the third visual sensor 112 may be coupled to a processor 124. The processor 124 may cause one or more of the cameras to capture image data and the processor 124 may process the image data causing the photophoretic optical trap display 100 to project an image using the scattering particle screen 106 as will be described in greater detail herein.

Figure 2:
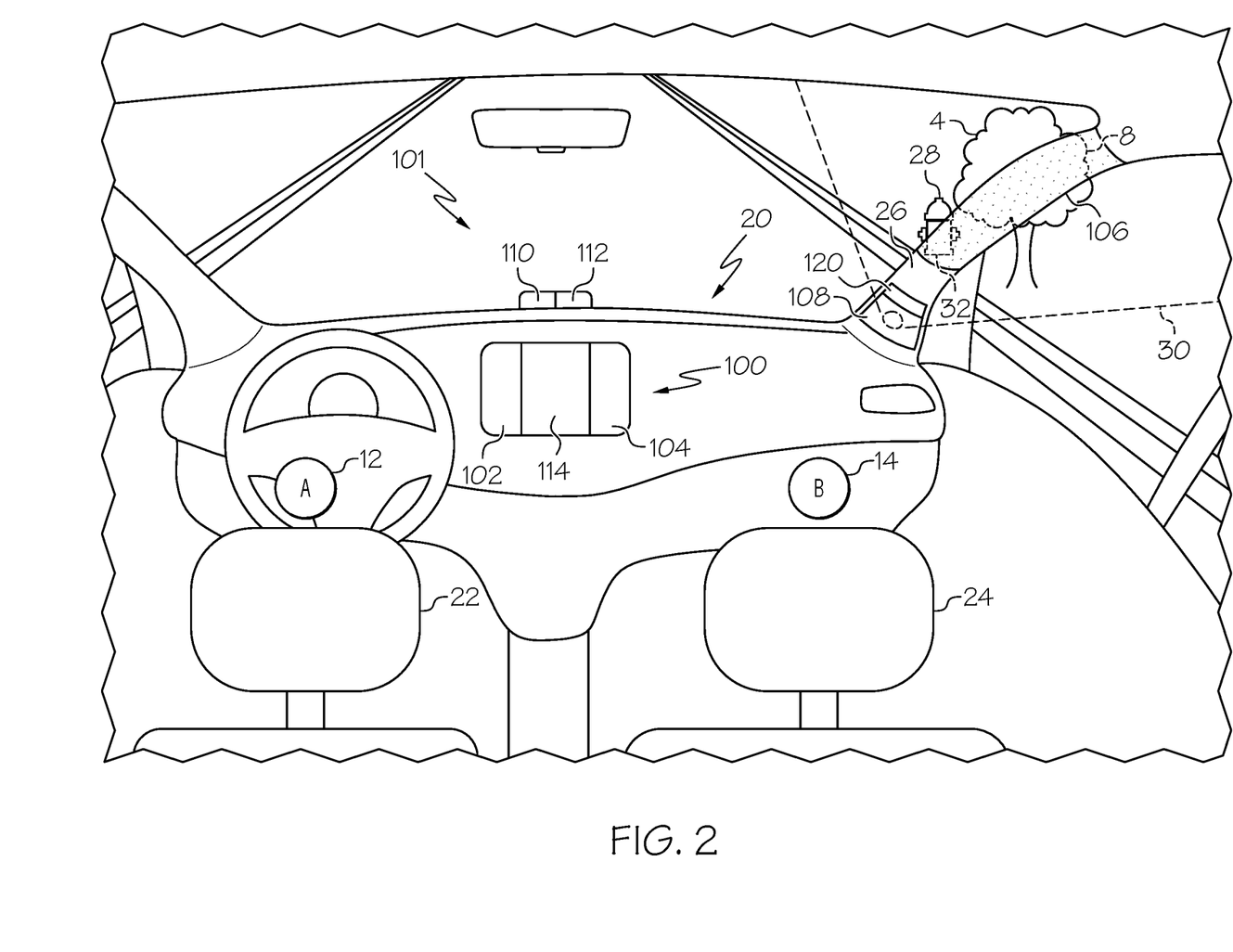
FIG. 2 depicts a particular application of the system for optically cloaking objects shown in FIG. 1, according to one or more embodiments shown and described herein.

Referring now to FIG. 2, the system 101 of FIG. 1 is shown in one exemplary application in the interior of a vehicle 20. The vehicle 20 includes a driver seat 22 and a passenger seat 24. In the exemplary embodiment depicted, the first vantage point 12 is from the driver seat 22 and the second vantage point 14 is from the passenger seat 24. An a-pillar 26 occludes a view of the first object 4 and a third object 28 from the first vantage point 12 and the second vantage point 14. A rendering of the first object 4 is shown as a first reproduction image 8 and a rendering of the third object is shown as a third reproduction image 32 as displayed by the scattering particle screen 106.

As shown in FIG. 2, the photophoretic optical trap display 100 including the trap light source 102 and the illumination light source 104 is positioned between the driver seat 22 and the passenger seat 24 and may hang from a ceiling in the interior of the vehicle 20, but it is to be understood that this is merely an exemplary embodiment and that the features described herein could be in any arrangement within the vehicle 20. The scattering particle screen 106 is positioned in a vicinity of the a-pillar 26. Additionally, the scattering particle screen manipulation device 120 and the visual sensor 108 are positioned at the a-pillar 26. The visual sensor 108 is configured to face outward from the vehicle with a FOV 30 that captures visual image data of the first object 4 and the third object 28 (e.g., with the lens of the visual sensor 108 facing toward the first object 4 and the third object 28).

In the exemplary embodiment depicted in FIG. 2, the trap light source 102 and the scattering particle screen manipulation device 120 are configured to hold the one or more particles of the scattering particle screen 106 in position around the a-pillar 26 and one or more of the trap light source 102 and the scattering particle screen manipulation device 120 may manipulate an orientation of the one or more scattering particles that make up the scattering particle screen 106 according to the principles described herein. However, it is to be understood that one or more of the scattering particles could be held in place and oriented by the trap light source 102 simultaneously or that the one or more scattering particles could be held in place by the trap light source 102 and oriented by the scattering particle screen manipulation device 120 or vice-a-versa individually. The scattering particle screen manipulation device 120 and/or the trap light source 102 may be used to make the three-dimensional images generated by the system 101 appear to have depth and perspective by moving and/or orienting the one or more scattering particles.

The trap light source 102 and the scattering particle screen manipulation device 120 hold the one or more scattering particles of the scattering particle screen 106 in place and the illumination light source 104 illuminates the scattering particle screen 106 to generate a reproduction image that is a three-dimensional image of the scene outside the vehicle 20 within the FOV 30. Image data is captured by the visual sensor 108 to generate the reproduction image. In the particular embodiment depicted, the first object 4 is a tree and the third object 28 is a fire hydrant. The tree and the fire hydrant are reproduced on the scattering particle screen 106 such that there is effectively no visual gap in the view of the external environment as seen from the first vantage point 12 and the second vantage point 14 as there would be with only an a-pillar 26. Moreover, one or more of the trap light source 102 and the scattering particle screen manipulation device 120 may texturize the scattering particle screen 106 such that the objects appear to have perspective and depth as they would appear from the first vantage point 12 and the second vantage point 14 if viewed uneclipsed by the a-pillar 26 using the human eye. That is, the tree may appear closer to the vehicle 20 than the fire hydrant.

In some embodiments, the image reproduced on the scattering particle screen 106 may be calibrated based on a vantage point. For example, the second visual sensor 110 may be located at a second visual sensor location and may capture an image of the external environment and the image generated using the photophoretic optical trap display 100 may be based on the image data captured by the second visual sensor 110. The image data captured by the second visual sensor 110 may be referred to as first image calibration data and may be used to calibrate the image displayed on the scattering particle screen 106 to appear as it would appear from a particular vantage point. For example, the image may be calibrated to appear as it would appear from the first vantage point based on the image data captured by the second visual sensor 110. That is, an appearance of the reproduction image may be based on the first image calibration data. In embodiments, the image produced on the scattering particle screen 106 may be calibrated based on image data captured by the third visual sensor 112 which may be located at a third visual sensor location. For example, the image on the scattering particle screen 106 may be calibrated to appear as it would appear to an observer at the second vantage point 14 based on image data captured by the third visual sensor 112.

In some embodiments, the image reproduced on the scattering particle screen 106 may be calibrated using a calibration visual sensor 114, which may be located at a calibration visual sensor location that is capable of capturing an image of the scattering particle screen 106. Accordingly, the calibration visual sensor 114 may capture an image of the scattering particle screen 106 and the photophoretic optical trap display 100 may alter the image generated based on the image data captured by the calibration visual sensor 114. More specifically, in some embodiments, an appearance of the reproduction image may be based on the first image calibration data captured as described herein and the feedback image calibration data. Further, in some embodiments, the vantage point of a user may be captured using one or more of the visual sensors described herein. That is, for example, a driver of the vehicle 20 may image his or her head or eye height and the system 101 may calculate a vantage point of the driver and use this calculation to calibrate the reproduction image displayed to the driver. The calibration visual sensor 114 may then be used to capture an image of the reproduction image as it is displayed by the scattering particle screen 106 and calibrate the reproduction image based on the captured visual data. In some embodiments, a driver may order the system 101 to recalibrate the reproduction image on demand. In some embodiments, the system 101 may automatically recalibrate the reproduction image.

In embodiments, the scattering particles that make up the scattering particle screen may reflect light anisotropically. That is, they may reflect light differently in different directions. Anisotropic reflection may be achieved using the principles described herein. Anisotropic reflection may be used to impart one or more visual effects to the scattering particle screen 106. For example, anisotropic reflection may be used to make the scattering particle screen at least partially occluded from one or more vantage points. Briefly referring to FIGS. 1 and 2, anisotropic reflection may be used to occlude the view of a first scene sector 16 from the second vantage point 14. One or more of the trap light source 102 and the scattering particle screen manipulation device 120 may be used to manipulate one or more of a position and an orientation of the scattering particles. Accordingly, the one or more scattering particles may reflect light differently to one vantage point than to another vantage point. This effect may be used to at least partially occlude the light reflected by the scattering particle screen to the second vantage point 14 and thus alter the image as it appears in the scattering particle screen 106 from any particular vantage point shown. Referring to the specific example embodiment shown in FIG. 2, the passenger at the second vantage point 14 may not see either or both of the first object 4 and the third object 28 in the scattering particle screen 106.

In some embodiments, one or more of the trap light source 102 and the scattering particle screen manipulation device 120 may be used to impart a three-dimensional contour to the scattering particle screen 106 that may texture or contour the image offering the viewer additional information. For example, with reference to FIG. 2, the first object 4 may be in the foreground with respect to the third object 28. The scattering particle screen 106 may be contoured such that the image of the first object 4 appears closer to the viewer than the third object 28. Accordingly, a viewer may determine with greater clarity that the first object 4 is nearer his or her vehicle 20 than the third object 28.

In some embodiments, the system 101 may include one or more image or pattern recognition algorithms (e.g., in the memory module 126) and the image or pattern recognition algorithms may be used to selectively display objects on the scattering particle screen 106. For example, the processor 124 may be configured to process image data and recognize pedestrians. The processor 124 may further be configured to selectively show images of pedestrians captured by the various visual sensors on the scattering particle screen 106 such that whenever a pedestrian is in view of the visual sensors and occluded from sight at one or more of the vantage points by the a-pillar 26, an image of the pedestrian is displayed on the scattering particle screen 106.

Figure 4:
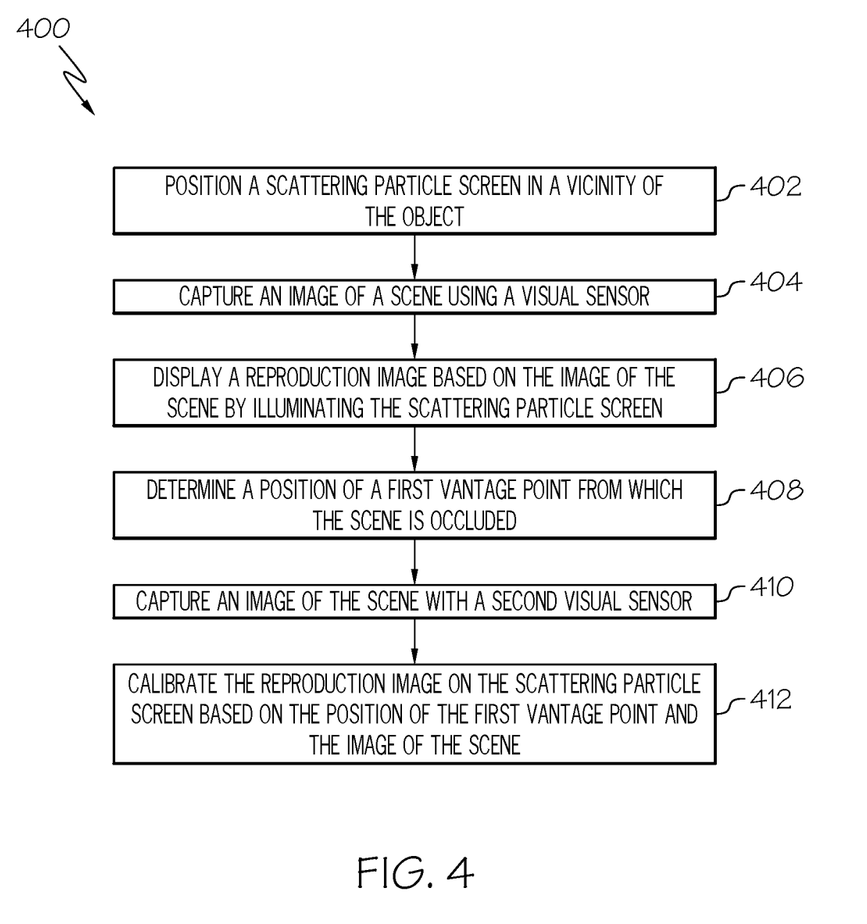
FIG. 4 depicts an exemplary method of optically cloaking objects using the system of FIG. 1, according to one or more embodiments shown and described herein.

Referring now to FIG. 4, an exemplary method for optically cloaking an object using a photophoretic optical trap display 100 is depicted. The method generally includes positioning a scattering particle screen in a vicinity of the object, capturing an image of a scene using a visual sensor, and displaying a reproduction image that is based on the image of the scene captured by the visual sensor by illuminating the scattering particle screen using an illumination light source. The method may further include determining a position of a first vantage point from which the scene is occluded, capturing an image of the scene with a second visual sensor, and calibrating the reproduction image on the scattering particle screen based on the position of the first vantage point and the image of the scene captured with the second visual sensor. The functionality described in FIG. 4 may be implemented by the control module 122 which may be configured to execute machine readable instructions stored in the memory module 126 with the processor 124.

At step 402, a scattering particle screen 106 may be positioned in a vicinity of an object. The scattering particle screen 106 may be made from one or more scattering particles. The scattering particle screen 106 may be held in place in the vicinity of the object 2 using, for example, a trap light source 102 and/or a scattering particle screen manipulation device 120 that uses one or more of magnetic forces, electromagnetic forces, ultrasonic forces, and fluid (e.g., air) pressure to manipulate a position and/or orientation of the one or more scattering particles. The scattering particle screen 106 may surround or cover all or a portion of the object. As one non-limiting example, the scattering particle screen 106 may cover all or a portion of a-pillar 26 of a vehicle 20. The scattering particles may be held in place around the a-pillar 26 using the forces described herein. In some embodiments, the distance between the object and the scattering particles is constant across the area of the scattering particle screen 106. For example, the scattering particle screen 106 may be flat with respect to the object. In other embodiments, the distance between various portions of the scattering particle screen 106 and the object may vary based on one or more criteria. For example, the scattering particle screen 106 may be three-dimensional (e.g., contoured, texturized, etc.) and may indicate a relative distance between different objects or images displayed on the screen.

At step 404, an image of a scene may be captured using a visual sensor 108. The image can be captured using any visual sensor now known or yet to be developed. In one exemplary embodiment, the image may be a scene external to a vehicle 20. The scene may include any subjects and may extend for any visual arc around the visual sensor from less than 1 degree to 360 degrees. In some embodiments, the scene encompasses a 60 degree visual arc in front of the vehicle. In some embodiments, the scene may be divided into any number of sectors. For example, the scene may be dissected into a first sector and a second sector. In some embodiments, the image data associated with the various sectors (e.g., the first sector and the second sector) may be captured simultaneously. In other embodiments, the image data may be captured separately, for example, sequentially. In some embodiments, the image data may be captured in color or in black and white. In some embodiments, the field-of-view (FOV) of the visual sensor may be adaptable based on one or more criteria. For example, the FOV of a visual sensor for a system on a vehicle 20 may be adaptable based on a speed of the vehicle 20. For example, the FOV of the visual sensor 108 may narrow as the speed of the vehicle 20 increases. In some embodiments, the FOV of the visual sensor 108 may be adaptable based on a direction or steering system of the vehicle 20. For example, as the vehicle 20 is turning right, the FOV of the visual sensor 108 may turn right and/or left as the vehicle 20 turns. In some embodiments, the FOV of the visual sensor 108 may be based on a direction of a gaze of a user of the vehicle 20. For example, a driver may move his or her gaze left or right as he or she drives and the system 101 may track a direction of the driver's gaze using, for example, a second visual sensor 110 and the FOV of the visual sensor 108 may be adjusted based on the driver's gaze.

At step 406, the system 101 may display a reproduction image that is based on the image of the scene captured by the visual sensor 108 by illuminating the scattering particle screen 106 using an illumination light source 104. The reproduction image may include one or more external objects. In some embodiments, the reproduction image is a flat image in which all of the pixels in the image are co-planar with one another. In some embodiments, the co-planar pixels may be in a circular, cylindrical, or curved plane that is generally contoured to surround an object. In some embodiments, the object is the a-pillar 26 of the vehicle 20 and the scattering particle screen 106 is contoured based on a shape of the a-pillar 26. In other embodiments, the scattering particle screen 106 is three-dimensional and the reproduction image includes a contour or textured surface. The contour and/or texture of the scattering particle screen 106 may be affected by one or more of the trap light source 102 and the scattering particle screen manipulation device 120. The illumination light source 104 may illuminate the one or more scattering particles with visible light to reflect the reproduction image to a user of the system (e.g., a driver/passenger of the vehicle 20). In some embodiments, the illumination light source 104 may illuminate the one or more scattering particles with infrared and/or ultraviolet light in addition to or in place of visible light.

At step 408, a position of a first vantage point 12 from which the scene is occluded may be determined. The first vantage point occlusion location may be determined, for example, based on an input from a second visual sensor 110. The second visual sensor 110 may be placed separately from the visual sensor 108 and the position of the first vantage point 12 may be determined based on one or more of the difference in location of the visual sensor 108 and the second visual sensor 110, a calibration of the visual sensor 108, and a calibration of the second visual sensor 110.

At step 410, a second image of the scene may be captured using the second visual sensor 110. The second visual sensor 110 may operate similarly to the visual sensor 108 except that the location of the second visual sensor 110 may be distinct from the location of the visual sensor 108. At least some portion of the FOV of the visual sensor 108 and the FOV of the second visual sensor 110 may overlap. Accordingly, some objects detected by the visual sensor 108 may be detected by the second visual sensor 110. The system 101 may use image or pattern recognition algorithms and/or image or pattern comparison algorithms to compare the images captured by the second visual sensor 110 and the visual sensor 108 and determine a difference factor, for example, between the images captured using the visual sensor 108 and the second visual sensor 110.

At step 412, the system 101 may calibrate the reproduction image on the scattering particle screen 106 based on the position of the first vantage point and the image of the scene captured by the second visual sensor 110. That is, the reproduction image may be configured to appear as the scene would appear from the first vantage point 12 if the object cloaked by the scattering particle screen 106 were not positioned between the scene and the observer at the first vantage point 12. For example, with brief reference to FIG. 2, the image displayed on the scattering particle screen 106 may appear to show the first object 4 (tree) and the third object 28 (fire hydrant) as they would appear to the driver of the vehicle 20 at the first vantage point 12 as the tree and the fire hydrant would appear to the driver of the vehicle 20 if there were no a-pillar 26. In some embodiments, the scattering particle screen 106 may be contoured and/or texturized such that the tree and the fire hydrant have some relative apparent difference between the two, increasing the depth of the reproduction image displayed on the scattering particle screen 106 and the usefulness of the system 101 to the driver.

It should now be understood that it may be possible to cloak an a-pillar, or any object, with an image that is a visual reproduction of the surrounding environment. Moreover, it may be possible to calibrate that image based on a particular vantage point, such that the object is cloaked in a reproduction image that appears as the surrounding environment would appear from the vantage point in the absence of the object. This cloaking effect may effectively remove the windshield from the field of view of an observer at the vantage point. In some embodiments, the object may be cloaked using a photophoretic trap display that generates an image by illuminating one or more particles that are trapped using photophoresis. By cloaking opaque objects in between the vantage point and an observed object, the observed object may be seen from the vantage point.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for optically cloaking an object, the system comprising:
   a photophoretic optical trap display comprising a trap light source and an illumination light source; and
   machine readable instructions stored in a memory module, when executed by a processor, cause the processor to:
   identify a first object and a second object of a plurality of objects exterior of a vehicle in an image captured by a visual sensor;
   manipulate one or more of a position and an orientation of one or more scattering particles using anisotropic reflection such that the first object is selectively displayed in a reproduction image generated by the photophoretic optical trap display to be visible from a first vantage point of an occupant of the vehicle and occluded from being viewed from a second vantage point of another occupant of the vehicle; and
   manipulate one or more of the position and the orientation of the one or more scattering particles using anisotropic reflection such that the second object is selectively displayed in the reproduction image to be visible from the second vantage point and occluded from being viewed from the first vantage point.

2. The system of claim 1, further comprising a second visual sensor at a second visual sensor location that captures first image calibration data.

3. The system of claim 2, wherein an appearance of the reproduction image is based on the first image calibration data.

4. The system of claim 2, further comprising:
   a calibration visual sensor at a calibration visual sensor location that captures feedback image calibration data; and
   a scattering particle screen that is made from one or more scattering particles in a vicinity of the object;
   wherein the calibration visual sensor captures an image of the scattering particle screen.

5. The system of claim 4, wherein an appearance of the reproduction image is based on the first image calibration data and the feedback image calibration data.

6. The system of claim 1, wherein the one or more scattering particles is manipulated using a scattering particle screen manipulation device using one or more of magnetic forces, electromagnetic forces, ultrasonic forces, and fluid pressure.

7. The system of claim 6, wherein one or more of a trap light source and the scattering particle screen manipulation device manipulates one or more of the position and the orientation of the one or more scattering particles to texturize the reproduction image.

8. The system of claim 7, wherein the image captured by the visual sensor is divided into a first scene sector and a second scene sector and one or more of the trap light source and the scattering particle screen manipulation device manipulates one or more of the position and the orientation of the one or more scattering particles such that the reproduction image displays the first scene sector at the first vantage point and the second scene sector at the second vantage point.

9. A vehicle including a system comprising:
   a photophoretic optical trap display comprising a trap light source and an illumination light source;
   wherein:
   a first object and a second object of a plurality of objects exterior of the vehicle are identified in an image captured by a visual sensor,
   one or more of a position and an orientation of one or more scattering particles is manipulated using anisotropic reflection such that the first object is selectively displayed in a reproduction image generated by the photophoretic optical trap display to be visible from a first vantage point of an occupant of the vehicle and occluded from being viewed from a second vantage point of another occupant of the vehicle, and
   one or more of the position and the orientation of the one or more scattering particles is manipulated using anisotropic reflection such that the second object is selectively displayed in the reproduction image to be visible from the second vantage point and occluded from being viewed from the first vantage point.

10. The vehicle of claim 9, wherein the reproduction image is displayed on an a-pillar of the vehicle.

11. The vehicle of claim 10, wherein a scattering particle screen manipulation device is located in the a-pillar of the vehicle.

12. The vehicle of claim 9, further comprising a second visual sensor at a second visual sensor location that captures first image calibration data.

13. The vehicle of claim 12, wherein an appearance of the reproduction image is based on the first image calibration data.

14. The vehicle of claim 12, further comprising a calibration visual sensor at a calibration visual sensor location that captures feedback image calibration data.

15. The vehicle of claim 9, wherein a field of view of the visual sensor is adaptable based on each of a speed of the vehicle, a steering system of the vehicle, and a gaze of an occupant of the vehicle.

16. A method comprising:
   positioning a scattering particle screen including a plurality of scattering particles in a vicinity of an object of a vehicle;
   identifying a first object and a second object of a plurality of objects exterior of the vehicle in an image captured by a visual sensor;
   manipulating one or more of a position and an orientation of one or more scattering particles of the scattering particle screen using anisotropic reflection such that the first object is selectively displayed in a reproduction image generated by a photophoretic optical trap display to be visible from a first vantage point of an occupant of the vehicle and occluded from being viewed from a second vantage point of another occupant of the vehicle; and
   manipulating one or more of the position and the orientation of the one or more scattering particles using anisotropic reflection such that the second object is selectively displayed in the reproduction image to be visible from the second vantage point and occluded from being viewed from the first vantage point.

17. The method of claim 16, wherein the scattering particle screen is manipulated by one or more of a trap light source and a scattering particle screen manipulation device.

* * * * *

UNITED STATES PATENT AND TRADEMARK OFFICE
CERTIFICATE OF CORRECTION

PATENT NO. : 11,173,837 B2
APPLICATION NO. : 16/270288
DATED : November 16, 2021
INVENTOR(S) : Paul Schmalenberg and Ercan M. Dede Page 1 of 1

It is certified that error appears in the above-identified patent and that said Letters Patent is hereby corrected as shown below:

In the Specification

In Column 10, Line(s) 51, before "environment", delete "extemal"" and insert --external--, therefor.

In Column 13, Line(s) 42, after "more", delete ""extemal"" and insert --external--, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*